Nov. 13, 1934.  A. HOPP  1,980,588
FROZEN CONFECTION
Filed Dec. 16, 1931  2 Sheets-Sheet 1
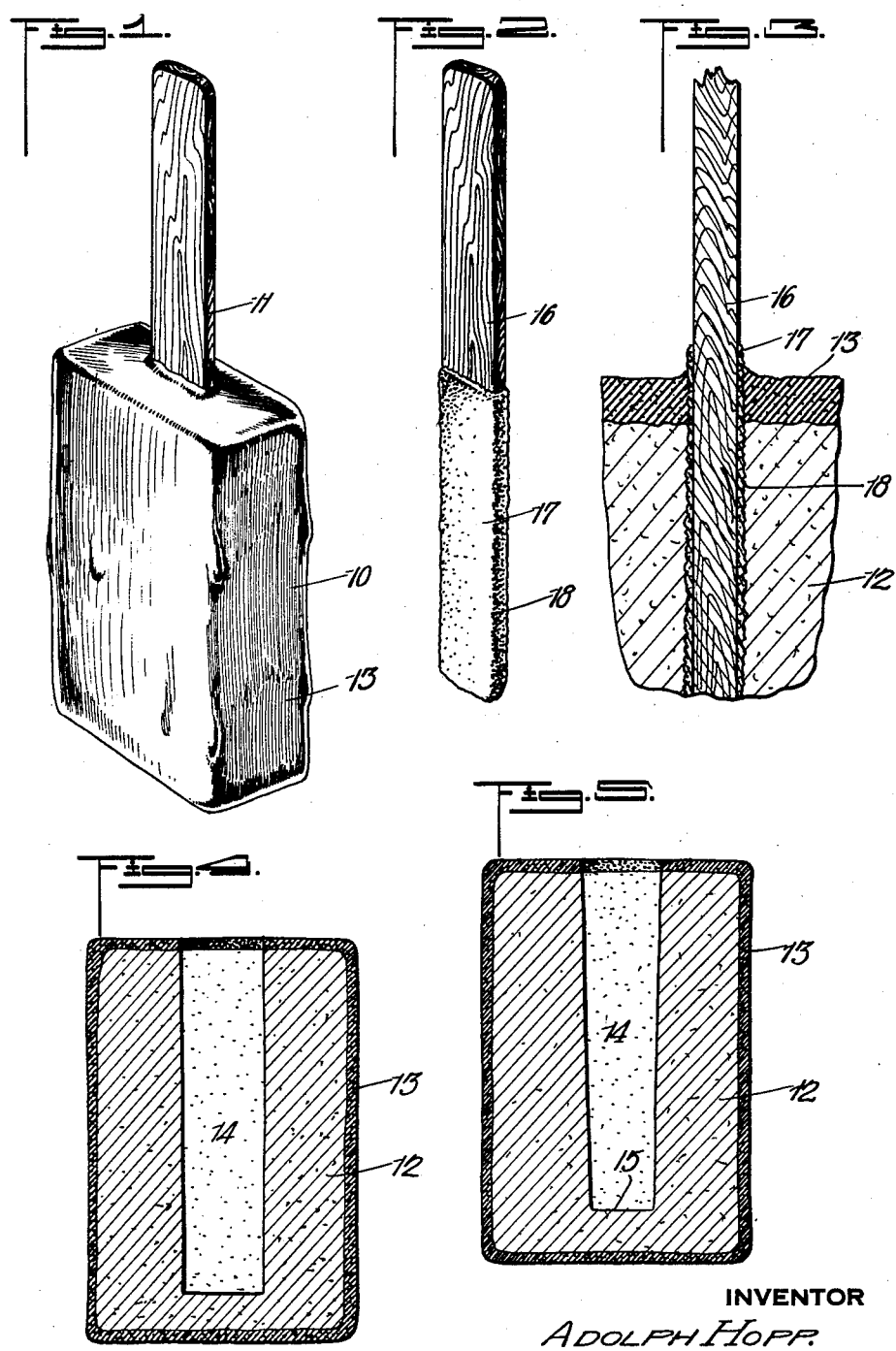
INVENTOR
ADOLPH HOPP.
BY HIS ATTORNEY

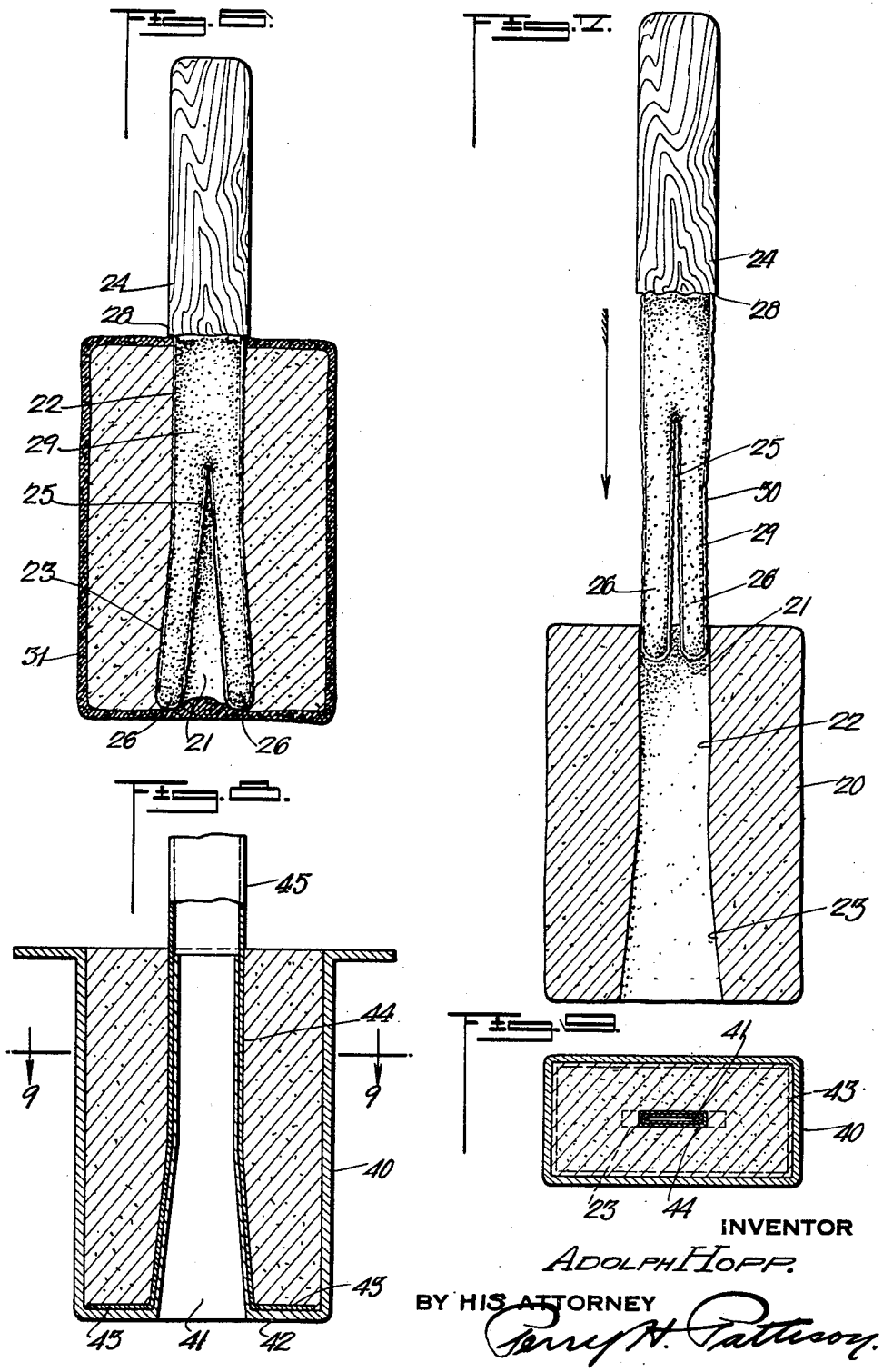

Patented Nov. 13, 1934

1,980,588

UNITED STATES PATENT OFFICE 1,980,588

FROZEN CONFECTION

Adolph Hopp, New York, N. Y.

Application December 16, 1931, Serial No. 581,285

4 Claims. (Cl. 99—16)

This invention relates to confections, and more particularly it pertains to frozen confections of the type which are carried by, or supported upon a stick or similar medium which forms a handle for convenient manipulation of the confection during eating thereof.

In such devices with which I am familiar it is a common practice to form the handle from either a round or flat stick of wood which wooden handles have a decided tendency to splinter or check to such an extent as to render their use highly undesirable and in many instances even dangerous, due to the liability of personal damage from such splinters.

Where ice cream, water ices and similar frozen confections have been employed, great difficulty has been experienced in forming an effective bond between the handle and frozen body, and to my best knowledge, this has been heretofore successfully accomplished only by congelation as described in the patent to one, Harry B. Burt, No. 1,470,525, October 9, 1923.

The method described in said patent, while it provides an effective bond between the frozen body and handle, has serious drawbacks in the packing and merchandising of the confections, particularly when the confections are to be stored in refrigerating compartments as is generally the case.

It is an object of the present invention to improve confections of the type which employs frozen bodies carried by a manipulating handle.

A feature of the invention resides in a novel form of handle for confections of the aforementioned type.

A further feature of the invention resides in a novel construction of handle whereby protection against splintering is provided.

A still further feature resides in a novel form of handle the use of which provides an effective bond between the handle and the frozen body.

Still a further feature of the invention resides in a novel method for attachment of the handle to the frozen body which method permits of attachment of the handle after the frozen body has been formed as distinguished from the above mentioned patent in which the bond between the frozen body and handle is formed during freezing of the frozen body.

Other features of the invention relate to certain novel and improved constructions and arrangements hereinafter described and pointed out in the claims, the advantages of which will be readily understood and appreciated by those skilled in the art.

The invention will be clearly understood from the accompanying drawings illustrating the invention in its preferred forms and the following detailed description of the constructions therein shown.

In the drawings:

Figure 1 is a perspective view of a confection constructed in accordance with the present invention, Figure 2 is a perspective view of the handle, or stick which forms the handle, Figure 3 is a detail fragmentary sectional view on an enlarged scale illustrating the manner in which the handle is attached to the frozen confection body, Figure 4 is a longitudinal sectional view of a frozen confection body constructed in accordance with one form of the invention, Figure 5 is a similar view of a slightly modified form of frozen confection body, Figure 6 is a longitudinal sectional view illustrating still another form of the invention, Figure 7 is a longitudinal sectional view illustrating the manner in which the handle disclosed in Figure 6 may be applied to the frozen body after the same has been frozen, Figure 8 is a longitudinal sectional view illustrating a mold for forming the frozen confection body, and;

Figure 9 is a transverse sectional view on the line 9—9 of Figure 8.

The confection consists of an edible body 10 and a manipulating handle 11 therefor. The body 10 is preferably formed from ice cream, water ice or similar frozen confection 12 and may or may not have an edible coating or covering 13.

As best illustrated in Figures 4 and 5, the frozen body 12 has a passage 14 which as shown extends preferably throughout the major portion of the length of the body 12, but which in some instances may extend entirely through the body portion as illustrated in Figure 7 if desired. In Figure 5, I have shown the passage 14 tapered in the direction of its closed end 15.

The handle 11 preferably consists of a relatively thin flat wooden stick 16. One end of this stick is provided with a protecting covering 17 which preferably completely encloses the end thereof. This protective covering is of any suitable edible material which will set hard preferably with a roughened outer surface 18 and I prefer to use a candy composition which may be applied by dipping the stick into a liquid mass after which it is subjected to any suitable hardening action.

The frozen bodies are enclosed in a suitable wrapper or protective covering and the handles are furnished separately or unattached to the frozen body.

The handles are preferably attached to the frozen body at the time of sale of the confection, and this is accomplished by inserting the covered end of the handle into the passage 14 of the frozen body. In that form of the invention illustrated in Figure 4 the passage 14 may be just a trifle smaller than the handle thus making it necessary to exert a slight pressure to force the handle home, while in the form illustrated in Figure 5, the taper of the passage 14 will cause the handle to dig into the side walls of the passage.

I have found that if the surface of the protecting coating 17 is roughened, a sufficient bond between the frozen body and the handle to secure the frozen body upon the handle may be obtained. Further, I have found in actual practice that by forming the frozen body with the passage the handle may be forced into the frozen body without danger of rupture thereof.

By this arrangement it will readily be recognized that the frozen bodies can be handled and stored with greater facility than is possible where the handles are attached as is the common practice. Also it will be apparent that the covering 17 will cover all checks or splinters thus protecting the mouth of the person eating the confection from danger of such defects.

In Figures 6 and 7 I have shown a modified form of the invention and in this form, the frozen body 20 is formed with a passage 21 having a substantially straight portion 22 and an enlarged or flared portion 23.

The handle member 24 is bifurcated as at 25 to provide two diverging finger-like members 26. The handle member 24 is formed from such material, preferably thin wood as will permit of the finger-like members 26 being sprung together as illustrated in Figure 7 while they are being forced through the straight portion 22 of the passage, and which will also cause the fingers to expand as illustrated in Figure 6 into engagement with the side walls of the enlarged or flared portion 23 of the passage.

This expansion of the finger-like portions 26 causes a firm and secure bond or lock with the frozen body 20 and provides for attachment of the handle member without damage to the body portion.

In this last described form of the invention, the handle member may be provided with a shoulder 28 which engages the end wall of the frozen body and which may serve to indicate the proper position of the handle member relative to the passage in the frozen body. In this form of the invention, as in the form heretofore described, that portion of the handle member which is embedded in the frozen body is covered with a protective coating 29 having an irregular or rough outer surface 30 and is similar in other respects to the covering 17 heretofore described.

In Figure 6 of the drawings, I have illustrated the frozen body 20 as provided with a covering 31, but this may if desired be omitted as illustrated in Figure 7.

As heretofore stated, the passage is preformed in the frozen body, and in Figures 8 and 9 I have shown one method of molding the frozen body by which this may be effected.

In these figures, 40 designates a mold receptacle having a centrally disposed tubular member 41 extending upwardly from the bottom wall 42 thereof. Surrounding this tubular member 41 there are members 45 each having an angular extension 43 on its lower end and having its upper end extended to form a manipulating handle 45.

These parts are positioned as illustrated in Figure 8 and the mold is charged with the material to be frozen to form the frozen body.

After the frozen body has been formed, the mold may be dipped in hot water or otherwise subjected to high temperature thus softening the frozen body where it contacts with the inner surface of the mold, and permitting its withdrawal from the mold merely by exerting a slight pull upon the extension 45 and lifting the same out of the mold by extensions 43 of the members 44, which members may then be readily removed from the frozen body.

The tubular member 41 is of such construction that it is likewise subjected simultaneously to high temperature which loosens the frozen body therefrom and permits of its ready removal from the tubular member, leaving the block and its passage free.

It is to be understood, however, that this is merely one manner in which I have chosen to illustrate the formation of the passage 22 and I therefore, do not wish to be limited to this method of forming these passages, as I am well aware that they may be formed in many other ways.

From the foregoing, it will be apparent that the present invention provides a new and improved frozen confection combined with a manipulating handle in which the handle is securely bonded to the frozen body. Furthermore, the invention provides a handle which, although formed of wood, is protected against all possibility of doing damage or injury by reason of splinters or other imperfections in the handle member.

While I have illustrated the invention in its preferred forms, it is understood that I do not wish to be limited to those forms herein shown, and reserve the right to practice the invention in such other forms and by such other methods as rightfully fall within the purview of the appended claims.

Having thus described the invention, what is claimed as new, and what it is desired to secure by Letters Patent of the United States, is;

1. A frozen confection comprising a frozen body having a passage therein, and a handle, said handle being expansible into engagement with the side walls of the passage to secure the handle to the frozen body.

2. A frozen confection comprising a frozen body having a passage therein, an expansible member adapted for insertion in said passage and adapted to expand into holding engagement with the side walls of said passage to form a lock between the frozen body and the expansible member, and a handle portion projecting from said expansible member.

3. A frozen confection comprising a frozen body having a passage therein which passage is enlarged throughout a portion of its length, and a handle member, said handle member having an expansible portion adapted to expand into the enlarged portion of said passage.

4. A frozen confection comprising a frozen body having a passage therein which passage is enlarged throughout a portion of its length, and a handle adapted for insertion in said passage, said handle having a contractible and expansible portion adapted to contract in its passage through the smaller portion of the passage, and to expand into engagement with the walls of the larger portion of the passage to secure the handle in the frozen body.

ADOLPH HOPP.